Sept. 8, 1953 R. A. PRIOR 2,651,704
TEMPERATURE RESPONSIVE SYSTEM
Filed Sept. 24, 1951
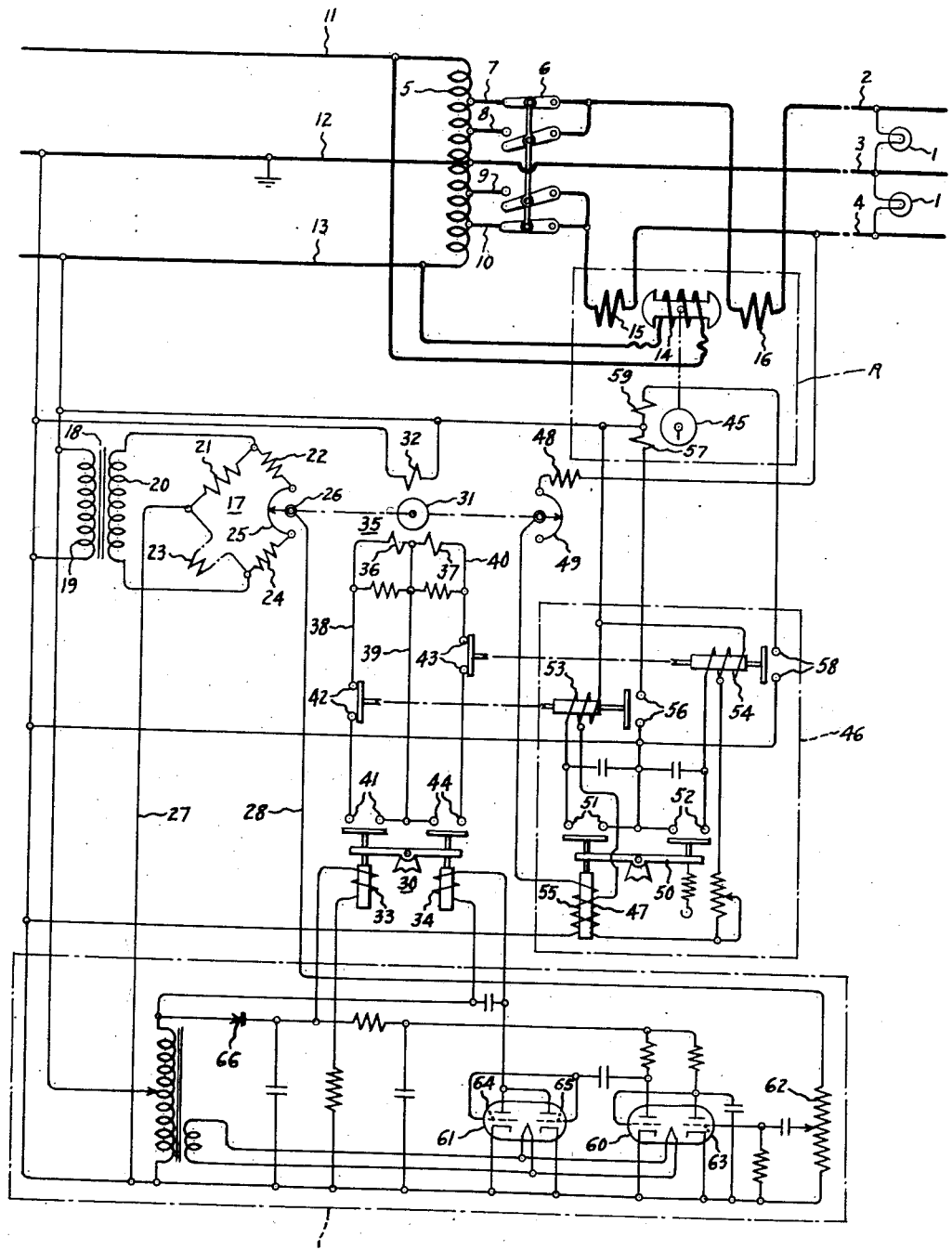
Inventor:
Roger A. Prior,
by    *Ernest H. Britton*
His Attorney.

Patented Sept. 8, 1953

2,651,704

UNITED STATES PATENT OFFICE 2,651,704

TEMPERATURE RESPONSIVE SYSTEM

Roger A. Prior, Pittsfield, Mass., assignor to General Electric Company, a corporation of New York Application September 24, 1951, Serial No. 247,958

3 Claims. (Cl. 219—20)

1

This invention relates to temperature responsive systems and more particularly to a temperature responsive system for use with electrical heating devices, such as infra-red lamps.

Although this invention is not limited to such use, it is particularly applicable to installations in which radiant energy devices, such as infrared lamps, are used to provide radiant heat energy to poultry, such as baby chicks in a poultry brooder.

In an installation such as a poultry brooder, where small chicks are placed after they have been hatched, it is important to supply sufficient thermal energy to the chicks to keep them warm and comfortable at all times to facilitate growth and prevent the chicks from crowding together with resultant smothering.

It has been common practice in brooding systems to supply thermal energy by heating the entire brooder house to the proper ambient temperature.

My invention may be used with a thermal energy level control system in which localized heat energy, such as radiant energy, is supplied in accordance with the ambient temperature, although the ambient temperature may not be substantially changed by the change in localized heat energy level.

Thus, for example, where my control system is applied to a poultry brooder installation, the radiant energy output to the chicks is changed in accordance with changes in ambient temperature, since the amount of radiant energy required by the chicks depends upon the ambient temperature. The amount of radiant energy required by chicks also depends upon the age of the chicks. The age factor may be compensated for by independent periodic adjustments.

The amount of radiant energy supplied is a function of applied voltage. Where the radiant energy is supplied to an installation like a poultry brooder, the amount of radiant energy necessary may be based upon the relationship of radiant energy requirements for various air temperatures and ages of chicks as determined by experimental studies at various agricultural stations. Such information may be correlated with infra-red lamp performance data to show the relation of required lamp output voltage with respect to air temperature and age of chicks.

Accordingly, it is an object of this invention to provide an electrical circuit arrangement which is responsive to temperature changes so as to regulate the output voltage to an energy utilization device which will compensate for temperature changes.

2

It is a further object of this invention to provide an electrical circuit arrangement which will detect temperature changes and initiate changes in the voltage output to an electrical heating device in such manner as to compensate for the detected temperature change, with a voltage regulating means for maintaining the necessary voltage for any given temperature condition within close limits also being provided.

In accordance with these objectives, this invention provides a Wheatstone bridge in which one of the resistance arms is subjected to the ambient temperature which is being measured, with variations in ambient temperature creating an unbalance of the bridge in such manner as to actuate a relay which adjusts the voltage level maintained by a voltage regulator. Appropriate changes in the voltage level maintained by the voltage regulator compensate for changes in ambient temperature by changing the voltage applied to radiant heat devices or other heating devices. A further feature of this arrangement is the use of an operating motor which rebalances the Wheatstone bridge, at the same time that it varies the voltage level maintained by a voltage regulator relay which controls the operation of the voltage regulator operating motor. In order to prevent hunting of the temperature compensation system and voltage regulating system with respect to each other, interlock means are provided to prevent operation of the motor which adjusts the voltage level maintained by the voltage regulator relay at the same time that the operating motor for the voltage regulator is in operation.

The features of this invention which I believe to be novel are set forth with particularity in the appended claims. My invention itself, however, both as to its organization and use, together with further objects and advantages thereof, may best be understood by reference to the following description taken in connection with the accompanying drawing which shows a circuit diagram for a temperature control system in accordance with my invention.

Referring now to the figure, there is shown a plurality of electrical heating devices 1, such as infra-red lamps, connected between power lines 2, 3 and 4 of a center-tapped single phase power supply. Any one lamp is connected only between two of the lines, such as between lines 2 and 3, or between lines 3 and 4. Line 3 is the grounded neutral line. Lines 2, 3 and 4 are connected to an autotransformer 5 through a switch 6. Switch 6 is provided with a plurality of contacts to taps 7, 8, 9 and 10, connected to the autotransformer winding 5. Taps 7 and 8 connect power line 2 to spaced apart points on the autotransformer winding 5, while taps 9 and 10 connect power line 4 to spaced apart points on the autotransformer winding. The contacts of switch 6 are so arranged that only one of the contacts connecting each of the respective power lines 2 and 4 to the autotransformer taps will be open at one time. Thus, in the drawing, the contact connecting tap 7 to the autotransformer is closed while the contact connecting tap 8 is open. Similarly, the contact connecting tap 10 is closed while the contact connecting tap 9 is open.

It will be understood, of course, that other methods of applying electrical power to the load devices may be used, and that I have described and shown only one of several different methods of providing such a connection. For example, the lines 2, 3 and 4 could be directly connected to the autotransformer 5 at appropriate points on the autotransformer winding and the switch 6 could be eliminated. Alternatively, a conventional transformer having separate primary and secondary windings could be used.

In order to maintain the voltage applied through lines 2, 3 and 4 to the load devices 1 at a predetermined value, a voltage regulator indicated generally as R is provided to maintain the voltage at a predetermined value as called for by a voltage regulator relay, as will be explained hereinafter. The autotransformer 5 is connected to an electrical power source through leads 11, 12 and 13, lines 11 and 13 being connected at the respective opposite ends of the autotransformer winding while line 12 is connected at the midpoint of the autotransformer winding.

The voltage regulator is provided with a shunt winding 14 which is connected across the outer lines 11 and 13 of the electrical power supply. The voltage regulator is also provided with two series windings 15 and 16 which are respectively placed in series with power lines 2 and 4 which supply the load 1. Windings 15 and 16 of the voltage regulator are in inductive relation with regulator shunt winding 14, and the voltage induced in windings 15 and 16 by shunt winding 14 may be varied by moving winding 14 relative to windings 15 and 16 by means of an operating motor for the voltage regulator, as will be explained hereinafter.

As has been explained hereinbefore, the radiant heat energy devices or other heating devices are placed in a location such as a poultry brooder, and this invention provides a system for regulating the heat energy output of the load 1 in accordance with the temperature variations of the location of the load 1. In order to obtain this regulated output of the radiant heat energy of load 1, a control system is provided in accordance with my invention, as will now be described.

In order to indicate variations of ambient temperature which require a compensation in the radiant heat energy output of load 1, I provide a Wheatstone bridge which is generally indicated by the number 17. The Wheatstone bridge 17 is energized by transformer 18 having a primary winding 19 and a secondary winding 20. Primary winding 19 is connected to power lines 12 and 13 and secondary winding 20 is connected to the Wheatstone bridge. The Wheatstone bridge comprises four resistance arms 21, 22, 23 and 24. One end of the secondary winding 20 is connected between resistance arms 21 and 22, while the other end of secondary winding 20 is connected between resistance arms 23 and 24. Resistance arm 23 comprises a temperature sensitive resistor which is exposed to the ambient temperature of the poultry brooder or other installation in which the heating load 1 is located, but is not exposed to the radiant energy being supplied. A variable resistance 25 is interposed between resistance arms 22 and 24 in such manner as to lie partly in each of the arms 22 and 24, depending upon the position of motor-operated slide member 26, as will be explained hereinafter. The resistances of all of the arms of the Wheatstone bridge except arm 23 have a low temperature resistance coefficient, and are affected by changes in ambient temperature to only a negligible extent.

When the Wheatstone bridge 17 becomes unbalanced, due to a change in the ambient temperature, a current is caused to flow through lines 27 and 28 which are respectively connected across the Wheatstone bridge in a well-known manner. Lines 27 and 28 are connected to an amplifier 29, which may be of any conventional type, and amplifies current from the lines 27 and 28 to a sufficient value to change the energization of relay 30, as will be explained in more detail hereinafter.

A motor 31 is provided for rebalancing the Wheatstone bridge and for simultaneously adjusting the resistance in series with a voltage regulator relay solenoid, thereby changing the voltage level maintained by the voltage regulator, as will be explained hereinafter. In the embodiment illustrated, motor 31 is a shaped pole induction motor having a stator winding 32 which is connected directly across the power lines 12 and 13. Shaded pole windings 36 and 37 are provided to permit operation of motor 31 in opposite directions.

While I have shown a reversible motor of the shaded pole induction type, it will be understood that any other type of reversible motor may be used.

One of the shaded pole windings, such as winding 36, is short circuited when the ambient temperature is too high, requiring a reduction in thermal energy output from load 1. Short circuiting of winding 36 causes motor 31 to turn in such a direction as to reduce the voltage setting of a voltage regulator relay 46 which is provided to maintain the voltage supply to the load 1 at a predetermined level, at the same time rebalancing Wheatstone bridge 17 for the higher ambient temperature. Winding 37 is short circuited when the ambient temperature is too low, requiring an increase in thermal energy output from load 1. Short circuiting of winding 37 causes motor 31 to turn in such a direction as to increase the voltage setting of solenoid 47 of voltage regulator relay 46, at the same time rebalancing Wheatstone bridge 17 for the lower ambient temperature.

Winding 36 is connected between leads 38 and 39, lead 38 being attached from one end of winding 36 through contacts 41 and 42 back to lead 39. Lead 40 is connected from the right-hand end of winding 37, with respect to the view shown in the drawing, through contacts 43 and 44 back to lead 39. Thus, it will be seen that when a circuit is closed through leads 38 and 39, winding 36 is short circuited, and when a circuit is closed through leads 39 and 40, winding 37 is short circuited. Contact 41 in series with winding 36 is a normally open contact which is closed by relay 30 when the Wheatstone bridge sends a signal to the relay 30 requiring a lower thermal energy output from load 1. Contact 42 is a normally closed contact which is opened to prevent hunting when the operating motor 45 for the voltage regulator is operating in a direction to lower the voltage maintained by the voltage regulator, as will be hereinafter described. Contact 44 is a normally open contact which is closed by relay 30 when the Wheatstone bridge sends a signal to the relay 30 requiring a higher thermal energy output from load 1. Contact 43 is a normally closed contact which is opened to prevent hunting when motor 45 for the voltage regulator is operating in such a direction as to raise the voltage maintained by the voltage regulator.

In order to maintain the voltage supply to the load 1 at a predetermined level, the voltage regulator relay which is indicated generally at 46 is provided.

In order to adjust the voltage level maintained by voltage regulating relay 46, a solenoid 47 is provided in series between power line 4 and the grounded neutral line 12. A fixed resistance 48 and a variable resistance 49 are connected in series with solenoid 47. By varying the total resistance in series with the solenoid 47, the total line-to-line voltage necessary to move the solenoid plunger varies. Variable resistance 49 is a motor-operated rheostat operated by motor 31. As has been previously explained, motor 31 operates in response to signals from Wheatstone bridge 17 caused by variations in the ambient temperature.

Motion of the plunger of solenoid 47 actuates a pivoted beam 50 in such manner as to close either contact 51 in the circuit of relay coil 53 or contact 52 in the circuit of relay coil 54. Due to the pivoted beam switching arrangement, only one of the contacts 51 or 52 can be closed at one time.

A holding coil 55 is connected between the midtaps of coils 53 and 54 and is energized the instant that either contact 51 or 52 is closed. The holding coil 55 modifies the pull of the solenoid 47 so as to hold either contact 51 or 52 closed until the voltage regulator has corrected the voltage to the value determined by the new setting of resistance 49 in the circuit of solenoid 47.

When the line-to-line voltage is substantially equal to that corresponding to the adjustment of the solenoid 47, the pivoted beam 50 will float in such manner as not to contact either of the contacts 51 or 52, and there is no motion of the operating motor 45 for the voltage regulator. However, when the line-to-line voltage dips below that for which the relay 46 has been set, the pivoted beam 50 will move in such a direction as to close contact 51, thereby closing the circuit of relay coil 53, which in turn closes a contact 56 in the circuit of winding 57 of operating motor 45 and causes that motor to turn in such direction as to cause the line-to-line voltage to be raised. At the same time, energization of relay coil 53 causes contact 42 in the circuit of winding 36 of motor 31 to be opened to prevent hunting between the temperature responsive system and the voltage regulating system. On the other hand, if the line-to-line voltage becomes too high, the pivoted beam 50 will move in such a manner as to close contact 52 and energize relay coil 54. Energization of relay coil 54 will cause closing of contact 58 in the circuit of winding 59 of operating motor 45 and cause that motor to turn in such a direction as to lower the line-to-line voltage. At the same time, energization of relay coil 54 causes contact 43 in the circuit of winding 37 of motor 31 to be opened to prevent hunting between the temperature responsive system and the voltage regulating system.

The amplifier 29 may be of any conventional type. In the embodiment shown in the drawing, an amplifier using two double triode tubes 60 and 61 is used. The signal from the Wheatstone bridge 17 is applied to a potentiometer 62 and thence to the first grid 63 of tube 60. The amplified voltage output of tube 60 is applied to the parallel grids 64 and 65 of tube 61, thereby regulating the plate current of tube 61 which flows through coil 34 of relay 30. Relay 30 is provided with a pivoted armature, and relay coils 33 and 34 act on opposite sides of the pivot.

Relay coil 33 is energized through a rectifier 66 from the lines 12 and 13. The circuit constants are so adjusted that when the Wheatstone bridge 17 is balanced, the two coils 33 and 34 have equal currents flowing through them. Consequently, the pull on each side of the pivoted armature is equal and neither contact 41 or 44 is closed. When the signal from the bridge 17 indicates that the ambient temperature is too high, the current through tube 61 increases, thereby permitting contact 41 to close. When the signal from the bridge indicates that the ambient temperature is too low, the current through tube 61 is decreased, thereby causing the pivoted armature of relay 30 to move in such a direction as to close contact 44.

An important feature of my invention is the fact that the motor 31 which moves the slide member 26 to rebalance the Wheatstone bridge 17 also moves the slider which adjusts the variable resitance 49 in the circuit of solenoid 47 of voltage regulator relay 46. The slider 26 which rebalances bridge 17 assumes a unique position for each ambient temperature. Therefore, the slider for the variable resistance 49 in series with the solenoid 47 of the voltage regulator relay 46 also assumes a unique position for a given temperature. By proper design, the variable resistance 49 can have its ohmic value so selected as to establish the proper voltage necessary to provide the proper amount of radiant heat energy from load 1 at any given ambient temperature.

It can be seen, therefore, that I have provided a circuit for detecting variations in ambient temperature, and have coupled that detection circuit to a suitable amplifying circuit for amplifying the detection signal so as to operate a motor device which simultaneously rebalances the Wheatstone bridge detection circuit and adjusts the resistance value in series with a solenoid for a voltage regulator control relay, so as to cause the voltage regulator to maintain a voltage corresponding to the new ambient temperature. At the same time, I have provided an interlock system in accordance with which hunting is prevented between the temperature responsive system and the voltage regulating system so that the voltage regulator may correct normal variations in voltage without causing operation of the temperature compensation system.

While I have shown a voltage regulator of the induction type, it will be obvious that other types of voltage regulators, such as, for example, a step voltage regulator, may be used.

While there has been shown and described a particular embodiment of my invention, it will be obvious to those skilled in the art that various changes and modifications can be made therein without departing from the invention, and, therefore, it is aimed in the appended claims to cover all such changes and modifications as fall within the true spirit and scope of the invention.

What I claim as new and desire to secure by Letters Patent of the United States is:

1. A temperature responsive and compensating system for an electrically-heated installation comprising a Wheatstone bridge, a temperature-sensitive resistance element in said bridge, said temperature-sensitive resistance element being subjected to the ambient temperature which is to be compensated, electrical heating means in said installation whose ambient temperature is being measured, said temperature-sensitive resistance element being disposed so as to be substantially unaffected by the heat given off by said electrical heating means, a source of electrical power connected to said electrical heating means, voltage regulating means for varying the voltage across said electrical heating means, a control means responsive to the voltage across said electrical heating means, said control means causing said voltage regulating means to maintain the voltage across said electrical heating means at a predetermined level, said control means being adjustable to vary the predetermined voltage level which it maintains, a motor means responsive to unbalance of said Wheatstone bridge, said motor means simultaneously rebalancing said bridge and adjusting said control means upon change of ambient temperature to cause said control means to maintain a voltage corresponding to the changed ambient temperature.

2. A temperature responsive and compensating system for an electrically-heated installation comprising a Wheatstone bridge having a temperature-sensitive resistance element, said temperature-sensitive resistance element being subjected to the ambient temperature which is to be compensated, said bridge being in circuit with a first relay means responsive to unbalance of said bridge, said first relay means being operable in opposite directions for deviations in opposite directions from a balanced condition of said bridge, a variable resistance connected in said bridge, a first motor means for changing the resistance value of said variable resistance to rebalance said bridge, said first relay means energizing said first motor means to rebalance said bridge upon the occurrence of an unbalance of said bridge due to deviations of said ambient temperature, electrical heating means for heating the installation whose ambient temperature is being measured, said temperature-sensitive resistance element being disposed so as to be substantially unaffected by the heat given off by said electrical heating means, a voltage regulating means for varying the voltage applied to said electrical heating means, a second motor means for operating said voltage regulating means, a second relay means responsive to the voltage across said heating means for causing the operation of said second motor means to maintain a predetermined voltage across said heating means, a variable resistance in series with said second relay means to vary the predetermined voltage maintained by said voltage regulating means, said first motor means simultaneously rebalancing said Wheatstone bridge and varying the variable resistance in series with said second relay means upon the occurrence of a change in ambient temperature to cause said voltage regulating means to maintain a predetermined voltage corresponding to said changed ambient temperature.

3. A temperature compensation system for an electrically heated installation comprising a Wheatstone bridge, a temperature-sensitive resistance element positioned in one arm of said bridge, said temperature-sensitive element being subjected to the ambient temperature which is being compensated, a first relay means in circuit with said Wheatstone bridge, said first relay means being operable in opposite directions in accordance with changes of the ambient temperature above and below the temperature at which said bridge is balanced, a variable resistance connected in said bridge, a first motor means for changing said variable resistance in circuit with said bridge to rebalance said bridge upon the occurrence of an unbalanced condition of said bridge, said first relay means being operable to cause the operation of said first motor means to rebalance said bridge, electrical heating means in said installation whose ambient temperature is being measured, said temperature-sensitive resistance element being disposed so as to be substantially unaffected by the heat given off by said electrical heating means, a source of electrical power connected to said heating means, voltage regulating means for varying the voltage across said electrical heating means, a second motor means for operating said voltage regulating means, a second relay means responsive to the voltage across said heating means to cause operation of said second motor means to cause said voltage regulating means to maintain a predetermined voltage across said heating means, variable resistance means connected in circuit with said second relay means to cause said second relay means to cause said voltage regulating means to maintain a predetermined voltage across said heating means, said first motor means simultaneously rebalancing said bridge and changing said variable resistance in circuit with said second relay means upon the occurrence of an unbalance of said bridge due to change in ambient temperature, thereby causing said voltage regulating means to maintain a predetermined voltage corresponding to said changed ambient temperature, with interlock means for preventing simultaneous operation of said first and second motor means.

ROGER A. PRIOR.

References Cited in the file of this patent
UNITED STATES PATENTS

| Number | Name | Date |
|---|---|---|
| 1,447,517 | Reid | Mar. 6, 1923 |
| 1,715,750 | Gano | June 4, 1929 |
| 2,366,501 | Gille | Jan. 2, 1945 |
| 2,375,988 | Gille et al. | May 15, 1945 |
| 2,495,844 | Hornfeck | Jan. 31, 1950 |
| 2,509,471 | Bielski | May 30, 1950 |
| 2,547,750 | Hall | Apr. 3, 1951 |
| 2,557,224 | Hornfeck | June 19, 1951 |
| 2,616,013 | Greenlee | Oct. 28, 1952 |
| 2,616,018 | Karp et al. | Oct. 28, 1952 |